United States Patent Office 3,472,841
Patented Oct. 14, 1969

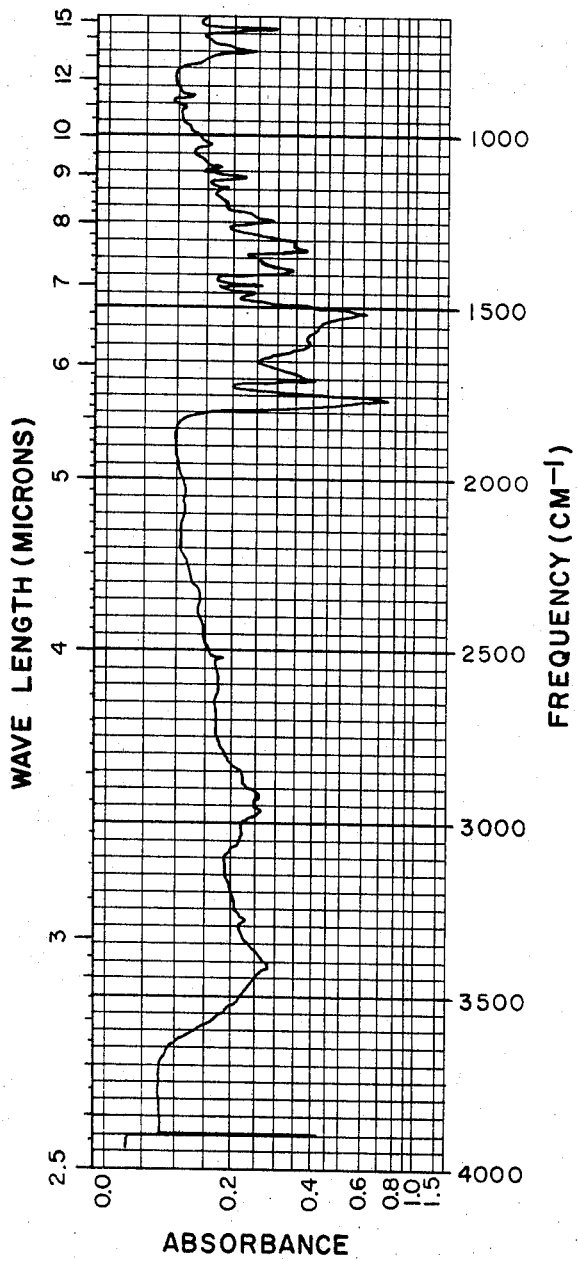

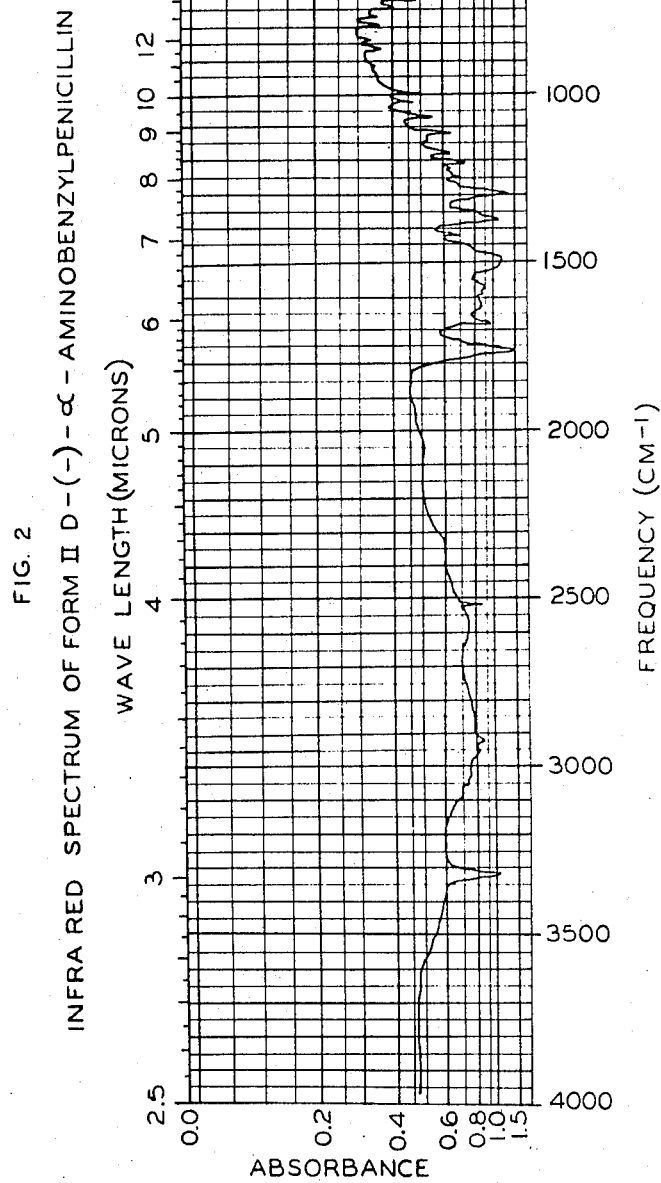

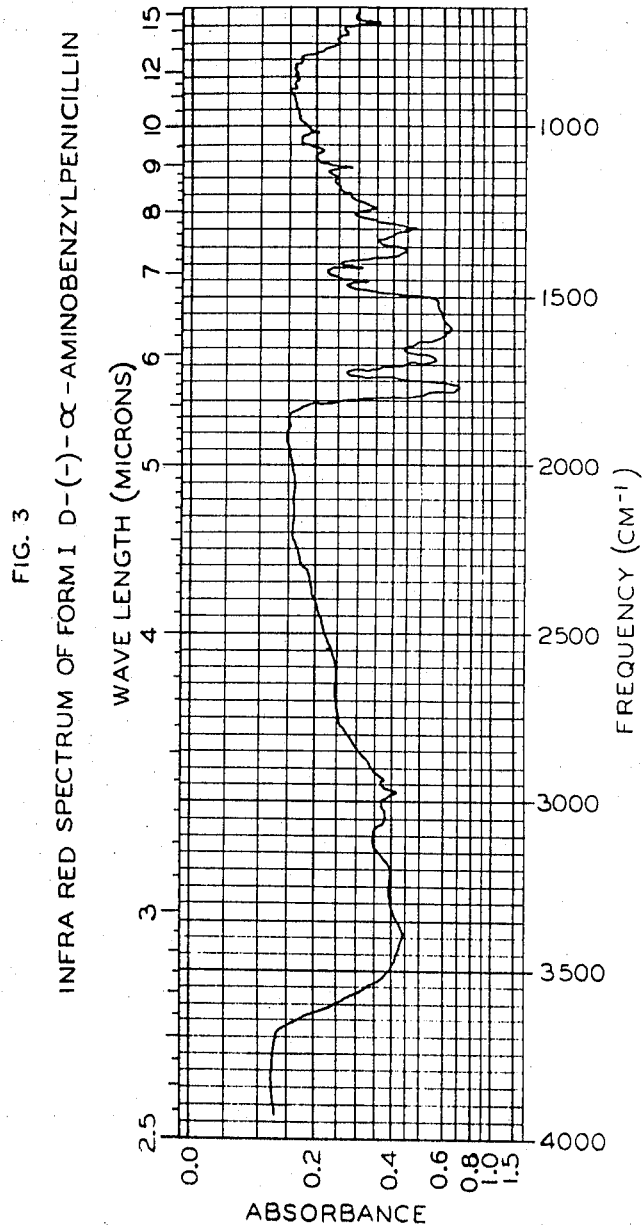

3,472,841
CRYSTALLINE FORM OF D-(—)-α-
AMINOBENZYLPENICILLIN
David A. Johnson, Fayetteville, and Glenn A. Hardcastle,
Jr., Syracuse, N.Y., assignors Bristol-Myers Company,
New York, N.Y., a corporation of Delaware
Filed Aug. 9, 1965, Ser. No. 478,275
Int. Cl. C07d 99/16; A61k 21/00
U.S. Cl. 260—239.1                     1 Claim

ABSTRACT OF THE DISCLOSURE

A novel stable crystalline form of D-(—)-α-amino-benzylpenicillin which is characterized by being substantially free of water in the chemically bound state, and by exhibiting an infrared absorption spectrum substantially as disclosed in FIG. 1 of the drawings is useful as an antibacterial agent.

---

This invention relates to a new form of D-(—)-α-aminobenzylpenicillin of value as an antibacterial agent, as a nutritional supplement in animal feeds, as an agent for the treatment of mastitis in cattle, as a therapeutic agent in poultry and animals, including man, and especially in the treatment of infectious diseases caused by gram-positive and gram-negative bacteria. More particularly, this invention relates to a novel, stable crystalline form of D-(—)-α-aminobenzylpenicillin designated as Form III D-(—)-α-aminobenzylpenicillin or Form III ampicillin which is characterized by being substantially free of water in the chemically bound state, and by exhibiting an infrared absorption spectrum substantially as disclosed in FIG. 1 of the drawings.

Antibacterial agents such as benzylpenicillin have proved highly effective in the past in the therapy of infections due to gram-positive bacteria, but such agents suffer from the serious drawbacks of being ineffective against numerous strains of bacteria, e.g., most gram-negative bacteria. The compound of the present invention is particularly useful in that it possesses potent antibacterial activity against both gram-positive and gram-negative bacteria upon either parenteral or oral administration, and also exhibits resistance to destruction by acid.

D-(—)-α-aminobenzylpenicillin, also known as D-6-(2 - amino-2-phenyl-acetamido)penicillanic acid, 6-[D-(—)-α-aminophenyl-acetamido]penicillanic acid, and as ampicillin, is known in the technical literature, having been described, for example, in United States Patent No. 2,985,648, the disclosure of which is incorporated herein by reference. According to the teachings of that patent, this penicillin is prepared by reaction of 6-aminopenicillanic acid with an acylating agent such as the acid chloride, acid bromide, acid anhydride, mixed anhydride, etc. of a derivative of D-(—)-α-aminophenylacetic acid in which the amino group is protected by a carbobenzoxy or other suitable protecting group. After completion of the acylation reaction, the protecting group is removed from the amino group such as by reduction with hydrogen in the presence of a catalyst. D-(—)-α-aminobenzylpenicillin is also described in United States Patent No. 3,140,282.

The known methods for the preparation of D-(—)-α-aminobenzylpenicillin by the acylation of 6-aminopenicillanic acid result in the preparation of aqueous mixtures which contain, in addition to the desired penicillin, unreacted 6-aminopenicillanic acid, hydrolyzed acylating agent, and products of side reactions such as the products of the acylating agent reacted with itself and/or with the desired penicillin, as well as other impurities. The D-(—)-α-aminobenzylpenicillin may then be recovered from the aqueous reaction mixture by concentration to small volume and recovering the product by filtration. The D-(—)-α-aminobenzylpenicillin is generally obtained in the form of a monohydrate, a dihydrate, or a mixture thereof. The monohydrates as well as the dihydrates of D-(—)-α-aminobenzylpenicillin possess poor stability. Recently, D-(—)-α-aminobenzylpenicillin trihydrate, described in United States Patent No. 3,157,640, has been found to be stable and an anhydrous form of D-(—)-α-aminobenzylpenicillin, described in United States Patent No. 3,144,445, which has been designated Form II D-(—)-α-aminobenzylpenicillin herein, has also been found to be stable. Form III D-(—)-α-aminobenzylpenicillin, described and claimed herein, is a distinctive form of anhydrous D-(—)-α-aminobenzylpenicillin, and is readily distinguished from Form II by its infrared absorption spectrum.

It is an object of this invention to provide a new form of D-(—)-α-aminobenzylpenicillin which possesses good stability upon storage.

This and other objects are achieved by the practice of this invention which comprises providing a new, stable crystalline form of D-(—)-α-aminobenzylpenicillin which is characterized by being substantially free of water in the chemically bound state and by exhibiting an infrared absorption spectrum substantially as disclosed in FIG. 1 of the drawings. More specifically, this invention comprises providing a new crystalline form of D-(—)-α-aminobenzylpenicillin characterized by being substantially free of water in the chemically bound state, having an infrared spectrograph as disclosed in FIG. 1 of the drawings, and possessing substantially greater storage stability than hydrated crystalline D-(—)-α-aminobenzylpenicillin.

The anhydrous D-(—)-α-aminobenzylpenicillin of this invention may be obtained by contacting at a temperature of at least 60° C. D-(—)-α-aminobenzylpenicillin·β-naphthalene sulfonate, also known as D-(—)-α-aminobenzylpenicillin·β-naphthalene sulfonic acid salt with an amine having the formula

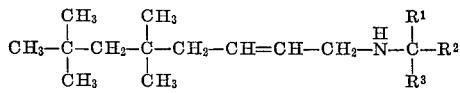

wherein each of $R^1$, $R^2$ and $R^3$ is an aliphatic hydrocarbon radical and wherein $R^1$, $R^2$ and $R^3$ contain in the aggregate of from 11 to 14 carbon atoms, in a water-immiscible solvent containing at least 3 moles of water per mole of such penicillin; to convert the D-(—)-α-aminobenzylpenicillin acid addition salt to its amphoteric form, whereupon Form III D-(—)-α-aminobenzylpenicillin precipitates and is collected. Mixtures of the above amines can also be used. These liquid amines and mixtures thereof are added to the solution in their free base form. The amount of such amines which is used will generally vary from about 68 to 250 percent by weight, and preferably from 85 to 150 percent by weight of the D-(—)-α-aminobenzylpenicillin·β-naphthalene sulfonate. While greater amounts of amine may be used, no significant advantage is obtained by using more than about 250 percent by weight of the D-(—)-α-aminobenzylpenicillin·β-naphthalene sulfonate.

The water - immiscible solvent in which the acid addition salt of D-(—)-α-aminobenzylpenicillin is contacted with the amine is preferably methyl isobutyl ketone. Other solvents which can be used include other (lower) ketones, (lower)aliphatic esters such as butyl acetate, halogenated (lower)hydrocarbons such as chloroform or methylene chloride, aromatic hydrocarbons such as toluene; (lower)alkyl ethers such as diamylether; and mixtures thereof with each other or with methyl isobutyl ketone. The amount of solvent used is not critical, and large amounts of the solvent can be used since Form III D - (—) - α - aminobenzylpencillin is not soluble in these materials.

In order to obtain Form III D - (—) - α - aminobenzylpenicillin it is essential to contact the D - (—) - aminobenzylpenicillin acid addition salt with the amine at temperature of at least 60° C. If temperatures of less than 60° C. are employed, D - (—) - α - aminobenzylpenicillin trihydrate is formed. The preferred temperature for contacting the D - (—) - α - aminobenzylpenicillin acid addition salt with the amine in order to form the Form III thereof is from about 60–70° C. Crystallization of the Form III D - (—) - α - aminobenzylpenicillin can be initiated if necessary by seeding. After precipitation of the product is completed, it is recovered by any suitable means, such as by filtration. The product can then be washed with an organic solvent such as methyl isobutyl ketone, and subsequently dried.

While α - aminobenzylpenicillin can exist in two optically active isomeric forms [ the D - (—)- and L-(+)- diastereoisomers], as well as in the DL form which is a mixture of the two optically active forms, the D-(—)- isomer being the most biologically active isomer, it has not as yet been determined whether the L-(+)- and DL forms can be prepared in crystalline form having the characteristics of Form III D - (—) - α - aminobenzylpenicillin. Therefore, the invention described and exemplified herein has been directed only to the D-(—)- isomeric form of α-aminobenzylpenicillin.

The D - (—) - α - aminobenzylpenicillin·β - naphthalene sulfonate used in the process for preparing the compound of this invention is described in United States Patent No. 3,180,862, and is prepared by contacting an aqueous solution of D - (—) - α - aminobenzylpencillin, such as an impure aqueous solution containing D-(—)- α - aminobenzylpenicillin obtained as described in United States Patent No. 2,985,648, with a β - naphthalene sulfonic acid. After reaction, the D - (—) - α - aminobenzylpenicillin·β - naphthalene sulfonate precipitates and is recovered.

The novel crystalline form of D - (—) - α - aminobenzylpenicillin of this invention is free of substantially free of water in the chemically bound state, containing less than about 1.8% water, and for that reason has been designated Form III D - (—) - α - aminobenzylpenicillin, or Form III ampicillin. Form III is characterized by its distinct crystal structure as demonstrated by its infrared spectrum, an example of which is shown in FIG. 1 of the drawings. Form III D - (—)α-aminobenzylpenicillin is readily distinguished from the anhydrous D - (—) - α - aminobenzylpenicillin described in United States Patent No. 3,144,445, and herein designated Form II, and the penicillin described in United States Patent No. 2,985,648 and herein designated Form I, examples of the infrared spectra of which are shown in FIG. 2 and FIG. 3 of the drawings, respectively, by comparing the infrared spectrum of FIG. 1 with those of FIGS. 2 and 3. The novel crystalline form of ampicillin of this invention is further characterized by the fact that it may be stored for long periods of time without substantial potency loss. The novel crystalline form of ampicillin has been found to possess substantially greater storage stability than hydrated crystalline D - (—) - α - aminobenzylpenicillin, i.e., mono- and dihydrates of D - (—)- α-aminobenzylpenicillin.

The peaks at 2,530, 1,429 and 1,009 cm.$^{-1}$ in the infrared absorption spectra of FIGS. 1, 2 and 3 are artificial and caused by operations within the infrared spectrophotometer, and therefore do not constitute a part of either infrared absorption spectrum.

The following examples will illustrate the present invention described herein without unduly restricting it.

EXAMPLE 1

To a vigorously agitated mixture of 100 liters of methyl isobutyl ketone, there are added 5 liters of water and 10 liters of a mixture of secondary amines wherein each secondary amine has the formula

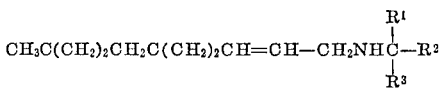

wherein each of $R^1$, $R^2$ and $R^3$ is an aliphatic hydrocarbon radical and wherein $R^1$, $R^2$ and $R^3$ contain in the aggregate of from 11 to 14 carbon atoms. This particular mixture of secondary amines, which is sometimes referred to as "Liquid Amine Mixture No. I," is a clear amber liquid having the following physical characteristics: viscosity at 25° C. of 7 cps.; specific gravity at 20° C. of 0.845; refractive index at 25° C. of 1.467; distillation range at 10 mm.; up to 160° C.—4%; 160 to 210° C.—5%; 210 to 220° C.—74%; above 220° C.—17%. This mixture is heated to 60–65° C. and then there is added slowly over a period of 30 minutes 10 kg. of D - (—) - α - aminobenzylpenicillin·β - naphthalene sulfonate. The mixture is agitated for 30 minutes at 60–65° C. The product, Form III D - (—) - α - aminobenzylpenicillin, precipitates and is collected by filtration. The filter cake of the product is washed with methyl isobutyl ketone, reslurried in 60 liters of methyl isobutyl ketone, filtered, washed with methyl isobutyl ketone, and then dried at 50–55° C.

The dried crystalline product, Form III D - (—)-α-aminobenzylpenicillin, obtained is found to weigh 5.15 kg., to contain 0.9% water (determined by Karl Fischer analysis), to bioassay 975 μcg./μg., and to have the infrared absorption spectrum disclosed in FIG. 1 of the drawings.

EXAMPLE 2

A comparison of the stability of Form III D-(—)-α-aminobenzylpenicillin was made with that of Form I D - (—) - α - aminobenzylpenicillin. Samples of Form III D - (—) - α-aminobenzylpenicillin (product of Example 1) and Form ID - (—) - α - aminobenzylpenicillin were placed in snap-cap vials and stored at 56° C. The potency of each sample was determined by bioassay before and after storage. The moisture content of each sample was determined by Karl Fischer analysis before storage. Sample 1 is Form III and Samples 2–5 are Form I D-(—)-α-aminobenzylpenicillin.

The test data are presented in the table below.

TABLE

[Potency stability at 56° C.]

| Sample | Percent Moisture | Bioassay, mcg./mg. | | | Percent Loss in Potency | |
|---|---|---|---|---|---|---|
| | | Original | 1 Mo. | 2 Mos. | 1 Mo. | 2 Mos. |
| 1 | 0.7 | 965 | 910 | 980 | 6 | +1.5 |
| 2 | 3.7 | 920 | 640 | 450 | 30 | 51 |
| 3 | 4.8 | 940 | 580 | | 38.5 | |
| 4 | 5.2 | 960 | 620 | 480 | 35.5 | 50 |
| 5 | 6.5 | 955 | 500 | | 51 | |

It is apparent from the table that Form III D-(—)-α-aminobenzylpenicillin (Sample 1) was more stable upon storage than Form I D - (—) - α - aminobenzylpenicillin (Samples 2–5).

While this invention has been described and exemplified in terms of its preferred embodiment, those skilled in the art will appreciate that modifications can be made without departing from the spirit and scope of this invention.

We claim:
1. The stable crystalline form of D - (—) - α - aminobenzylpenicillin which is characterized by being substantially free of water in the chemically bound state (containing less than about 1.8% water), having an infrared absorption spectrum substantially as disclosed in FIG. 1 of the drawings and possessing substantially greater storage stability than the monohydrates and dihydrates of D-(—)-α-aminobenzylpenicillin.

References Cited

UNITED STATES PATENTS 2,985,648 5/1961 Doyle et al. _____ 260—239.1
3,140,282 7/1964 Johnson et al. _____ 260—239.1
3,144,445 8/1964 Grant et al. _____ 260—239.1
3,299,046 1/1967 Alburn et al. _____ 260—239.1

NICHOLAS S. RIZZO, Primary Examiner

U.S. Cl. X.R.

260—999